United States Patent Office 2,997,383
Patented Aug. 22, 1961

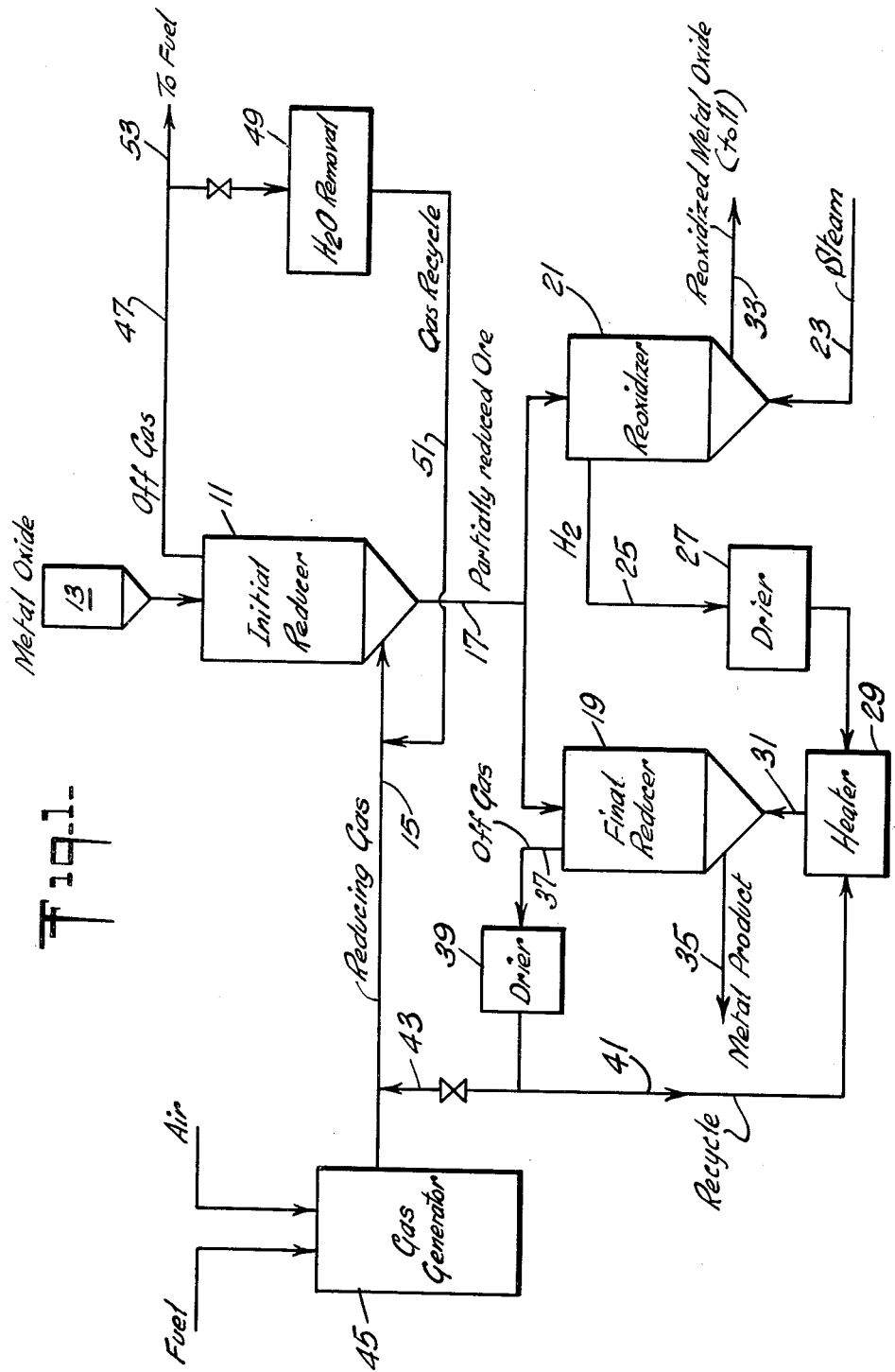

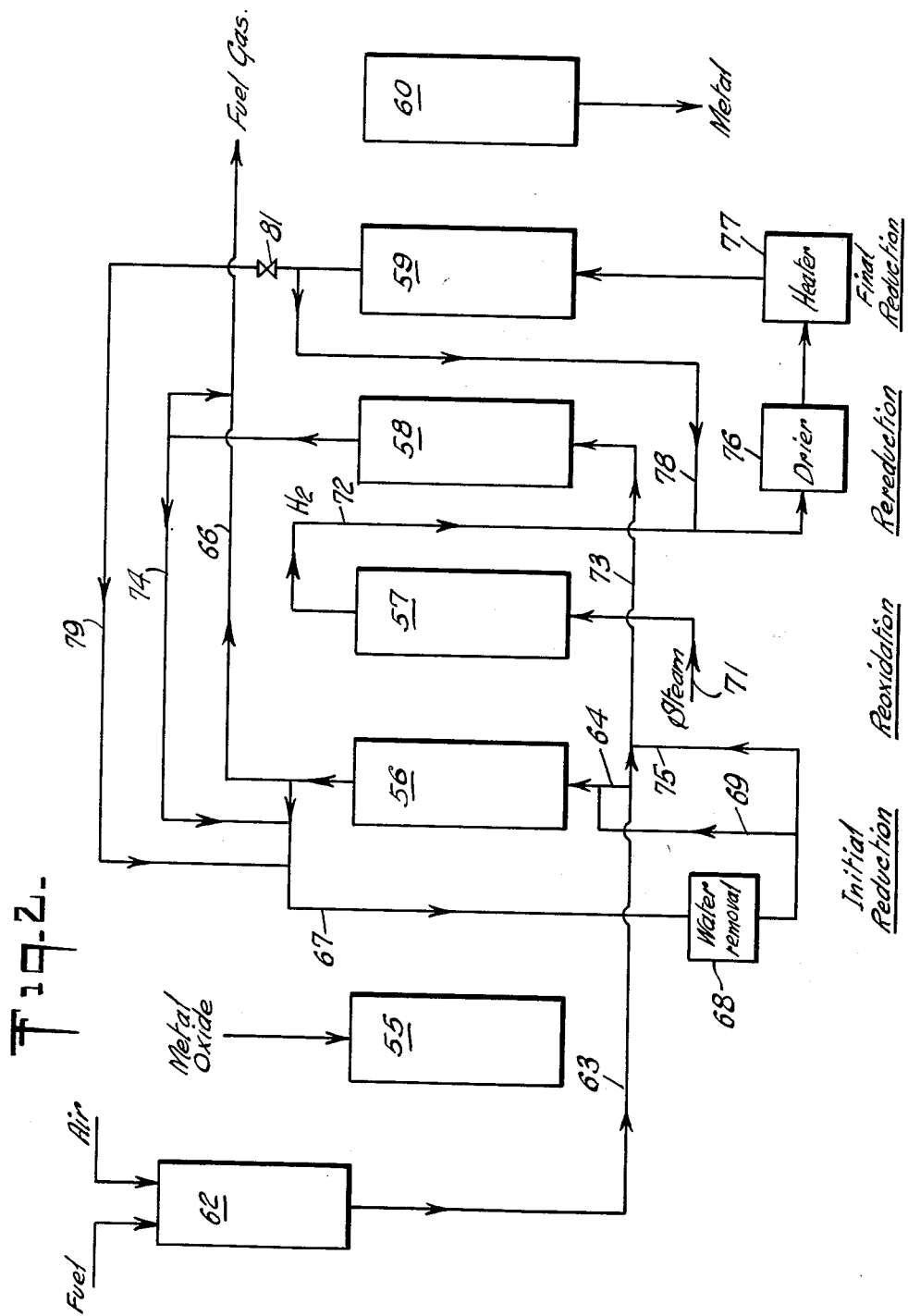

2,997,383
ORE REDUCTION
Thomas H. Whaley, Mount Vernon, N.Y., assignor to Texaco Development Corporation, New York, N.Y., a corporation of Delaware
Filed May 24, 1960, Ser. No. 31,329
17 Claims. (Cl. 75—35)

The present invention relates to a process for reducing metal oxide to metal, employing gaseous reducing agents. In one of its more specific aspects, the invention is concerned with a process for reducing iron oxide in two stages, whereby the oxide is only partially reduced in an initial reducing zone using a hot mixture of carbon monoxide and hydrogen, after which reduction is completed with hydrogen alone.

In accordance with this invention there is provided a process for reducing a reducible metal oxide to metal which comprises passing a hot gaseous reducing mixture of hydrogen and carbon monoxide in contact with the metal oxide to effect a partial reduction thereof, then passing steam in contact with at least part of the partially reduced product of said partial reduction step to react therewith and partially reoxidize said partially reduced product while concurrently generating hydrogen, and passing this steam-generated hydrogen in contact with metal oxide previously partially reduced by reaction with hydrogen and carbon monoxide reducing additional oxide and forming the final metal product. The steam-treated metal oxide is further treated by passing a hot gaseous mixture of carbon monoxide and hydrogen in contact therewith, after which it is finally reduced with hydrogen resulting from the steam treatment.

The process may be carried out continuously or batchwise. In the continuous type operation, a hot gaseous mixture of hydrogen and carbon monoxide is passed in contact with the oxide in an initial reduction zone to partially reduce the oxide, the partially reduced oxide is continuously withdrawn from the initial reduction zone and divided into two parts, one passing to a reoxidation zone wherein it is contacted with steam effecting partial reoxidation thereof and generating steam, and the other passing to a final reduction zone wherein it is contacted with hydrogen from the reoxidation zone effecting additional reduction of metal oxide to a metallic product. Metal oxide from the reoxidation zone is re-reduced with carbon monoxide and hydrogen and finally reduced with hydrogen, forming at least part of the feed to the final reduction zone.

The metal oxide is preferably treated in at least three reaction zones simultaneously, with the reduction of ore with carbon monoxide and hydrogen taking place in a first reaction zone, reoxidation and generation of hydrogen by reaction with steam taking place in a second reaction zone, and final reduction of metal oxide which previously has been partially reduced with carbon monoxide and hydrogen taking place in a third reaction zone. In a preferred embodiment, at least four separate reaction zones are employed with the metal oxide successively subjected to the action of:

(1) hot gaseous mixture of carbon monoxide and hydrogen;
(2) steam to partially reoxidize product of (1) and produce hydrogen;
(3) hot gaseous mixture of carbon monoxide and hydrogen to re-reduce product of (2); and
(4) hydrogen from (2) to produce final metal product.

While preferred types of operation have been described above, it is also possible to operate batchwise using only two reaction zones by passing carbon monoxide and hydrogen into both the first and second reaction zones in sequence or in parallel, discontinuing the flow of carbon monoxide and hydrogen and then passing steam into the second reaction zone while passing resulting hydrogen from the second reaction zone to the first reaction zone effecting final reduction of the charge in the first reaction zone. The first zone can then be recharged and carbon monoxide and hydrogen again passed through both, after which steam is preferably passed to the first reaction zone and hydrogen from the first passed to the second reaction zone for final reduction therein.

Preferred embodiments of the process are described in detail hereinafter with reference to the drawings, wherein:

FIG. 1 is a flow diagram of a continuous ore flow type operation showing diagrammatically an arrangement of apparatus suitable for carrying out the process; and FIG. 2 is a flow diagram of a batch type ore reduction operation, wherein multiple ore treating vessels are successively charged, placed on stream, and discharged.

Referring to FIG. 1 of the drawings, iron oxide, such as an oxidic iron ore is fed into an initial reducer 11 from a supply hopper 13. The ore may range in particle size from small lumps to fine powder. As the ore passes down through the reducer 11 it encounters upwardly flowing hot reducing gases comprising a mixture of hydrogen and carbon monoxide supplied to the bottom of the reducer by a conduit 15. These gases are initially at a temperature between 1800 and 2500° F. The temperature of the ore in the reducer is kept between 1100° and 1750° during reduction effecting reduction in the solid state without fusion or sticking of the particles. The temperature of the inlet gas stream to the reducer may be controlled by the controlled addition of recycle gas to the hot reducing gas in line 15, as described hereinafter.

When the ore reaches the bottom of reducer 11 it is partially reduced, say to an iron content of 80 to 90 percent by weight. It is then discharged as a finely divided solid through a conduit 17 and divided into two portions, one portion passing to a final reducer 19 and another portion passing to a reoxidizer 21.

In the reoxidizer 21, the hot, partially reduced ore flows downwardly countercurrently to an upwardly flowing stream of steam which is supplied to the bottom of the reoxidizer by a conduit 23. In the reoxidizer 21, the temperature is maintained between 1400 and 1700° F. without external heating. The steam reacts with the partly reduced ore in accordance with the following equations to partially reoxidize the metal and produce hydrogen:

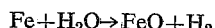
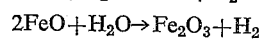

$$Fe + H_2O \rightarrow FeO + H_2$$

$$2FeO + H_2O \rightarrow Fe_2O_3 + H_2$$

Hydrogen leaves reoxidizer 21 by way of a conduit 25, passes through a drier 27 and then through heater 29 from which it is then passed through a conduit 31 into the bottom of the final reducer 19. In heater 29 the hydrogen is heated to a temperature between 900 and 1800° F. Partially reoxidized ore from the bottom of generator 21 is withdrawn through a conduit 33 and recycled back to the initial reducer 11 as part of the feed therefor.

In the final reducer 19, hot hydrogen passes countercurrently to the downwardly flowing partially reduced ore and completes the reduction in the solid state so that iron oxide is converted in the range 700 to 1400° F. to a metallic product of the desired degree of reduction. The temperature is maintained as high as possible within said range without fusion or agglomeration of the ore particles or iron product. This iron product, which may be 90 to almost 100 percent metallic iron, is then withdrawn from the bottom of the reducer through a conduit 35. Unreacted hydrogen leaving the top of the final reducer 19 passes through a conduit 37 and through a drier 39, and is then recycled through a line 41 to the heater 29 where it joins the hydrogen from reoxidizer 21. A purge stream of hydrogen can be passed through a conduit 43 into the conduit 15 which carries hydrogen and carbon monoxide to the initial reducer.

The mixture of hot hydrogen and carbon monoxide forming the initial reducing gas in the line 15 can be obtained in any desired manner. Preferably this mixture is generated in a gas generator 45 by the partial oxidation of a hydrocarbon, such as natural gas, fuel oil or crude petroleum residua, using air as the oxidizing medium. Details of a suitable partial oxidation process are disclosed in U.S. Patent No. 2,582,938. The initial reducing gas for my process is generated at a temperature between 1800 and 2500° F., preferably 1800 to 2200° F., to provide a reducing gas of low water and low carbon dioxide content. Care should be taken to keep the temperature in the reducer 11 below the fusion temperature, generally below about 1750° F. It is unnecessary to purify the generator gas of nitrogen, water vapor or other impurities prior to feeding it to the initial reducer since it is not intended that a complete reduction take place therein. Consequently, it is possible to use air instead of pure oxygen as the oxidizing gas in the gas generator 45.

The efficiency of reducing gas utilization may be increased by recycling part of the gas leaving the top of initial reducer 11 through line 47. Recycle gas passes through water remover 49 and then through a line 51, into reducing gas line 15 and into the reducer. The balance not required for recycle passes through line 53 to be used as fuel for other parts of the process, e.g. for the heater 29 and for generating steam supplied through line 23. The generation of reducing gas, generation of hydrogen, and ore reduction steps are all preferably carried out at elevated pressure, e.g. 100 to 600 pounds per square inch gauge. In some instances it may be desirable to conduct the initial reduction at atmospheric pressure or low pressure, e.g. 15 to 50 p.s.i.g. and to conduct the final reduction at elevated pressure, e.g. 100 to 600 p.s.i.g.

FIG. 2 of the drawings, illustrates diagrammatically an arrangement of apparatus employing a series of pressure vessels 55, 56, 57, 58, 59 and 60 arranged for treatment of the ore in sequence in the order mentioned. The piping, some of which is not shown, is constructed and arranged to be shifted at will from vessel to vessel sequentially to provide the flow pattern illustrated in the figure. It is to be understood that neither the specific arrangement illustrated nor the specific number of vessels is to be taken as limiting the invention.

In operation, standby vessel 55 is charged with ore while the bodies of ore in vessels 56, 57, 58 and 59 are undergoing processing. Metal resulting from the reduction of the ore is discharged from vessel 60, following which it becomes the standby vessel and is recharged with ore as illustrated in connection with vessel 55, the piping to vessel 56 is shifted to vessel 55 and vessel 55 replaces vessel 56 in the illustrated sequence, and so on down the line, vessel 59, replacing vessel 60.

Reducing gas, comprising mainly CO and $H_2$ is generated in gas generator 62 by reaction with fuel and air as previously described. Hot reducing gas from the generator is delivered through lines 63 and 64 to the first reduction step, as illustrated in connection with vessel 56, wherein reduction of the ore with carbon monoxide and hydrogen is carried out at a temperature below the fusion temperature of the ore or its reduction products. Effluent gas from vessel 56 may be discharged through line 66; this gas is suitable as fuel gas for plant use.

Although not illustrated in the figure, hot effluent gas from vessel 56 may be used to preheat the fresh charge of ore in vessel 55. This may be accomplished by direct heat exchange as by passing the hot effluent gas through the ore charge contained therein; or by burning the gas with air and passing the hot products of combustion through the ore charge.

It is generally desirable to recycle part of the effluent gas stream from vessel 56 to the same vessel to cool the hot stream of reducing gas from generator 62 and to increase the efficiency of utilization of the reducing gas. The recycle gas stream is withdrawn through line 67, passed to a water removal step 68 where it is treated for water removal, preferably by direct contact with cold water which cools the gas to about 100° F., and returned to vessel 56 through line 69.

Preferably the major portion of the ore reduction takes place in vessel 56. Although vessel 56 is illustrated as a single vessel, it is to be understood that a plurality of vessels may be used and are often advantageous because the time required for this particular step exceeds that of some of the other steps in the process.

Following initial reduction vessel 56, the connections are shifted and hot partially reduced ore is contacted with steam, as illustrated in connection with vessel 57, partially reoxidizing the partly reduced ore and producing hydrogen. Steam is supplied to vessel 57 through line 71 and the resulting hydrogen-rich gas is discharged through line 72 for use in the process as described more fully hereinafter.

The reoxidation step reoxidizes the ore to a minor extent, e.g. 2 to 20 percent depending upon hydrogen requirements. Following the reoxidation step, the connections are shifted and the partially reoxidized ore is again reduced, as illustrated in connection with vessel 58, with hot reducing gas from gas generator 62 supplied through line 73. Effluent gas from reducer 58, the second stage of the ore reduction, may be discharged to line 66 for use as fuel gas or recycled through line 74. Cooled recycle reducing gas may be supplied to line 73 through line 75.

Following the second stage of the ore reduction, as illustrated in connection with vessel 58, the connections are again shifted and the ore is finally reduced with hydrogen from vessel 57 as illustrated in connection with vessel 59. Hydrogen generated in vessel 57 is delivered by line 72 to drier 76 where unconverted steam is removed from the hydrogen-rich gas stream. Drier 76 may take the form of a refrigerated cooler or a direct water wash step in which the hydrogen-rich gas is cooled to a temperature not above about 100° F. and preferably to about 40° F. The dry hydrogen stream is passed through heater 77 where it is preheated to the extent required to maintain the temperature in the ore mass in vessel 59 above about 900° F., but below the fusion temperature of the ore, generally not above about 1050° F.

The major part of the gaseous effluent from vessel 59 is recirculated through line 78 to drier 76. A minor portion of the effluent from vessel 59 is bled off through line 79 as controlled by valve 81 to prevent the build-up of the impurities in the hydrogen reduction portion of the system. The hydrogen-rich bleed gas stream is preferably recirculated to the recycle system of the initial ore reduction stage of the process.

The operating conditions given above in the description of FIG. 1 apply generally also with respect to FIG. 2. A specific example illustrating the operation of the process in accordance with FIG. 2 of the drawings is given below:

*Example*

A vertical, cylindrical pressure vessel is loaded with 4,200 pounds of beneficiated hematitic iron ore (containing about 95 weight percent $Fe_2O_3$) having a particle size of range of 10 to 100 mesh, U.S. Standard Sieve Series. Hot reducing gas at a temperature of 2100° F. and containing about two parts hydrogen and three parts nitrogen to one part carbon monoxide by volume is generated by partial oxidation of natural gas with air. This gas is mixed with cold, dehydrated recycle gas at about 100° F. in an amount sufficient to reduce the temperature of the reducing gas to about 1750° F. Both the gas generation and the ore reduction are carried out at a pressure of 200 pounds per square inch gauge.

When the ore is approximately 85 percent reduced, i.e. 85 percent of its original oxygen content removed, the flow of reducing gas is discontinued and steam at 385 pounds per square inch gauge and 935° F. is passed into contact with the hot partly reduced charge of iron ore. After purging residual reducing gas from the vessel, the resulting hydrogen generated by reaction between the steam and iron is passed to a similar pressure vessel containing a corresponding charge of iron ore partially reduced to the same extent, i.e. about 85 percent oxygen removal, to supply hydrogen for completing the reduction of the second charge of ore. About 2500 standard cubic feet of hydrogen is produced per ton (2000 pounds) of ore by reaction with steam. This hydrogen is cooled in a refrigerated coil to about 40° F. condensing water therefrom, and utilized in the final reduction of the corresponding batch of ore in the second reducing vessel at 1000° F. and 370 pounds per square inch gauge in a closed hydrogen system, i.e., with substantially total recycle of hydrogen.

Following partial reoxidation by reaction with steam, hot reducing gas at 1750° F. and 200 pounds per square inch gauge is again admitted to the first pressure vessel into contact with the partially reoxidized ore, reducing the ore to about 85 percent completion, following which reduction of the ore is completed (over 95 percent reduced) with hydrogen at 370 p.s.i.g. at 1000° F.

Obviously, many other modifications and variations of the invention as hereinbefore set forth may be made without departing from the spirit and scope and only such limitations should be imposed as are indicated in the appended claims.

I claim:

1. A process for reducing a reducible metal oxide to metal which comprises passing a hot gaseous reducing mixture of hydrogen and carbon monoxide in contact with a mass of said metal oxide effecting a major part of the reduction of said oxide; passing steam in contact with at least part of the partially reduced mass to react with and partially reoxidize said partially reduced mass and concurrently generate hydrogen; and passing said steam-generated hydrogen in contact with partially reduced oxide resulting from partial reduction with said hydrogen and carbon monoxide effecting further reduction thereof and forming metal product, and again reducing said steam-treated metal oxide by passing a hot gaseous mixture of carbon monoxide and hydrogen in contact therewith.

2. A process in accordance with claim 1, wherein said metal oxide is simultaneously processed in at least three batches, a first batch being on stream for said gaseous reducing mixture, while a second batch of partially reduced ore is on stream for said steam, and while a third batch of partially reduced ore is on stream for said hydrogen from said second batch.

3. A process in accordance with claim 1 wherein said metal oxide is simultaneously processed in at least two batches in at least two reaction zones; wherein said hot gas mixture of carbon monoxide and hydrogen is passed into a first one of said reaction zones; wherein said hot gas mixture is passed into said second reaction zone; wherein steam is then passed into said second reaction zone generating hydrogen; and wherein said steam-generated hydrogen is passed from said second reaction zone into said first reaction zone to form said product.

4. A process in accordance with claim 1 wherein said mass of metal oxide is divided into four batches in four reaction zones; wherein each batch is successively subjected to the action of first step said hot gaseous mixture of carbon monoxide and hydrogen, second step said steam, third step said hot gaseous mixture again, and fourth step said hydrogen; wherein all of said batches are subjected to said action sequentially; and wherein the hydrogen for said fourth step is supplied by the reaction zone involved currently in said second step.

5. A process in accordance with claim 4, also comprising recycling effluent gas mixture from said first step back into said first step.

6. A process in accordance with claim 4, also comprising recycling effluent hydrogen from said fourth step back into said fourth step.

7. A process in accordance with claim 4, also comprising passing effluent hydrogen from said fourth step back to said first step.

8. A process for reducing metal oxide to metal which comprises subjecting first and second parts of said metal oxide to partial reduction by passing a mixture of hydrogen and carbon monoxide in contact therewith effecting a major part of the reduction of said oxide; subjecting said first part to the action of steam generating hydrogen by reducing said steam and concurrently oxidizing said partially reduced part; passing said steam-generated hydrogen in contact with said second part of said mass to complete reduction thereof and form metal product; and again reducing said first part by passing a hot gaseous mixture of carbon monoxide and hydrogen in contact therewith.

9. A process for the reduction of a reducible metal oxide which comprises subjecting said metal oxide to partial reduction with a reducing mixture of carbon monoxide and hydrogen under conditions and for a period of time effecting a major part of the total reduction of said metal oxide, partially reoxidizing at least a portion of resulting partially reduced product by contact with steam effecting production of hydrogen by reaction of steam with said partially reduced product, subjecting said partially reoxidized product of said steam treatment to further reduction with a reducing mixture of carbon monoxide and hydrogen, and subsequently passing hydrogen from said steam contacting step into contact with said further reduced product effecting still further reduction with hydrogen and forming a metal product.

10. In a process for the direct reduction of a reducible metal oxide wherein said metal oxide is subjected to reduction with a hot reducing mixture of carbon monoxide and hydrogen effecting a major part of the total reduction of said metal oxide, the improvement which comprises contacting at least a portion of resulting partially reduced metal oxide product from said carbon monoxide-hydrogen reduction reaction with steam under conditions effecting partial reoxidation of said product and the simultaneous production of hydrogen, and passing hydrogen from said reoxidation reaction in contact with partially reduced metal oxide product resulting from partial reduction of said metal oxide with a reducing mixture of carbon monoxide and hydrogen effecting further reduction of said metal oxide product with hydrogen and forming a finally reduced metal product.

11. A process for reducing metal oxide to metal which comprises passing a hot gaseous mixture of hydrogen and carbon monoxide in contact with said oxide in an initial reduction zone to partially reduce said oxide; withdrawing said partially reduced oxide from said initial reduction zone; passing a first portion of the withdrawn partially reduced oxide to a reoxidizing zone; passing steam in contact with said partially reduced oxide in said reoxidizing zone effecting partial reoxidation of said partially reduced oxide and generation of gaseous hydrogen; returning resulting partially reoxidized metal oxide from said reoxidizing zone to said initial reduction zone; passing the remainder of said withdrawn oxide into a final reducing zone; and passing hydrogen from said reoxidation zone into contact with said remainder in said final reducing zone to reduce additional metal oxide therein and form a metal product.

12. A process in accordance with claim 11, also comprising heating the hydrogen from said hydrogen generator to a high temperature effective for the reducing reaction prior to introducing said hydrogen into said final reducing zone.

13. A process in accordance with claim 11, also comprising withdrawing unused hydrogen from said final reducing zone, removing water therefrom, and recycling dehydrated hydrogen back into said final reducing zone.

14. A process in accordance with claim 11, also comprising passing unused hydrogen from said final reducing zone into admixture with said hydrogen and carbon monoxide entering said initial reducing zone.

15. A process in accordance with claim 11, wherein said mixture of hydrogen and carbon monoxide is generated by the partial oxidation of a carbonaceous fuel in a gas generation zone, and is passed from said gas generation zone to said reducing zone at a high enough temperature to effect the reduction reaction in said initial reducing zone.

16. A process in accordance with claim 11, wherein said metallic oxide is passed downwardly in said initial reduction zone in countercurrent contact with an upwardly flowing stream of the reducing gas, said partially reduced oxide being continuously withdrawn from said initial reducing zone and passed to said reoxidizing zone and said final reducing zone.

17. A process in accordance with claim 16, wherein said metallic oxide is maintained in a fluidized state in said initial reducing zone.

No references cited.